United States Patent
Saur et al.

(10) Patent No.: US 6,449,553 B1
(45) Date of Patent: Sep. 10, 2002

(54) MOTOR VEHICLE CONTROL DEVICE WITH REGULATION AND/OR LIMITATION OF DRIVING SPEED

(75) Inventors: Joerg Saur, Eislingen (DE); Andreas Kirchberger, Sinzing (DE)

(73) Assignees: DaimlerChrysler AG, Stuttgart (DE); Siemens AG, Munich (DE)

( * ) Notice: Subject to any disclaimer, the term of this patent is extended or adjusted under 35 U.S.C. 154(b) by 0 days.

(21) Appl. No.: 09/700,058
(22) PCT Filed: Apr. 23, 1999
(86) PCT No.: PCT/EP99/02737
    § 371 (c)(1),
    (2), (4) Date: Feb. 8, 2001
(87) PCT Pub. No.: WO99/58360
    PCT Pub. Date: Nov. 18, 1999

(30) Foreign Application Priority Data

May 9, 1998 (DE) .......................... 198 20 830

(51) Int. Cl.[7] .............................................. B60K 31/00
(52) U.S. Cl. ........................ 701/93; 701/102; 180/197
(58) Field of Search ................. 701/93, 94, 96, 701/110, 102, 101; 123/352; 180/197, 170, 171

(56) References Cited

U.S. PATENT DOCUMENTS

| | | | |
|---|---|---|---|
| 3,890,360 A | * 6/1975 | Pruvot et al. ................. 82/163 |
| 5,625,558 A | 4/1997 | Togai et al. .......... 364/426.041 |
| 5,713,428 A | * 2/1998 | Pohn .......................... 180/179 |
| 5,774,820 A | * 6/1998 | Linden et al. .............. 180/179 |

FOREIGN PATENT DOCUMENTS

| | | |
|---|---|---|
| DE | 44 39 424 C1 | 11/1994 |
| EP | 0 299 235 | 6/1988 |

* cited by examiner

*Primary Examiner*—William A. Cuchlinski, Jr.
*Assistant Examiner*—Marthe Y. Marc-Coleman
(74) *Attorney, Agent, or Firm*—Crowell & Moring LLP

(57) ABSTRACT

A vehicle engine control apparatus has a driver-operated engine operation preset control element and a speed regulation stage and/or limiting stage for regulating or limiting, respectively, the speed of travel using an engine-power-related nominal preset signal and emitting an engine-power-related speed regulation or speed limiting control signal. A torque characteristic stage emits an engine-torque related nominal preset signal as a function of the operation of the engine operation preset control element and of engine rotation speed information. This nominal preset signal is supplied to an engine/power characteristic stage which is provided on the input side of the speed regulation or limiting stage and determines the engine-power-related nominal preset signal from this as a function of the engine rotation speed. The engine-power-related speed regulation or speed limiting control signal is transformed to an engine-torque-related control signal by means of a power/torque characteristic stage on the output side.

8 Claims, 1 Drawing Sheet

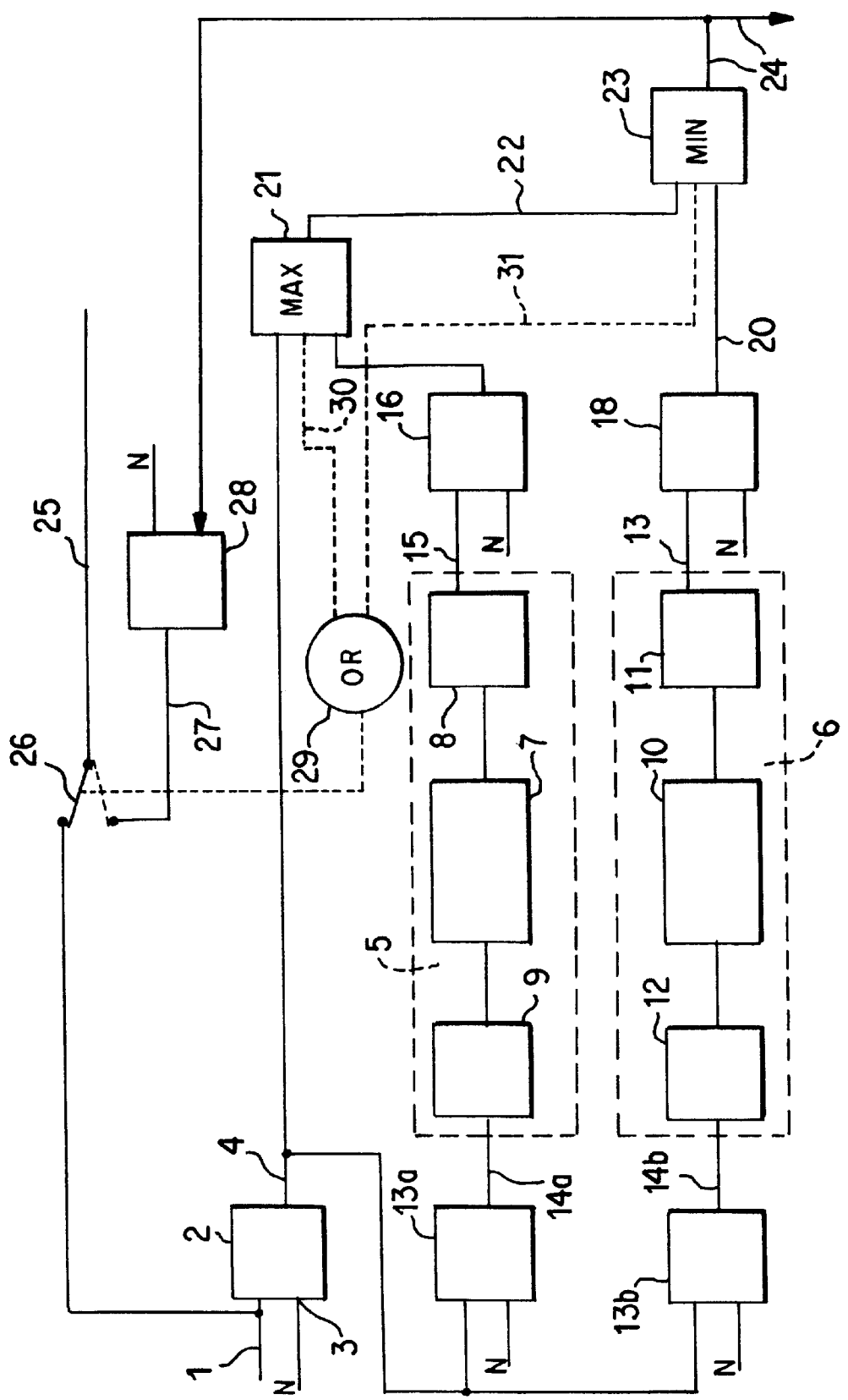
Fig

MOTOR VEHICLE CONTROL DEVICE WITH REGULATION AND/OR LIMITATION OF DRIVING SPEED

This application claims the priority of PCT International Application No. PCT/EP99/02737, filed Apr. 23, 1999 and German patent document 198 20 830.8, filed May 9, 1998, the disclosure of which is expressly incorporated by reference herein.

BACKGROUND AND SUMMARY OF THE INVENTION

The invention relates to a vehicle engine control device having a driver-operated engine operation preset control element and a speed regulation and/or limitation stage which regulates or limits the vehicle travelling speed, using an engine-power-related nominal preset signal and emitting an engine-power-related control signal (DE 44 39 424 C1).

Various versions of such vehicle engine control devices are known. The engine operation preset control element is used by the driver to influence engine operation in a desired manner; that is, to demand a desired engine operating state. Traditionally, this control element is an accelerator pedal, which can be deflected by the driver and whose deflection represents the engine operating state desired by the driver. In the most widely used, conventional system type, as is traditionally used in motor vehicle internal combustion engines having a throttle valve, the accelerator pedal deflection is interpreted as demanding a corresponding setting for the throttle valve position, and thus as an engine-power-related setting signal, for example in the form of the classical mechanical coupling between the accelerator pedal and the throttle valve. Speed regulation units and speed limiting units, such as those which have been introduced by the Applicant under the designations Tempomat™ and Speedtronic™, operate on this basis at the throttle valve position preset level. They are thus related to engine power, in that they are supplied with the accelerator pedal position information as an engine-power-related nominal preset signal and they emit an engine-power-related control signal for regulating the throttle valve position and, possibly, other engine power parameters, in particular the fuel injection parameters, in such a way that the speed of travel is regulated or limited at a desired nominal value. One example of such an apparatus is disclosed in German Patent Document DE 37 10 891 A1. Another speed regulation system of this conventional type, which is particularly suitable for Otto-cycle or diesel engines with injection, is described in German Patent Document DE 44 39 424 C1, which has already been cited above.

This conventional regulation and/or limiting of the speed of travel at the throttle valve position level, and thus at the engine power level, has a self-stabilizing effect. This is because, as the rotation speed increases, the amount of combustion air with which the cylinder is filled is reduced, so that the engine torque decreases and, in consequence, the power is reduced. When the rotation speed decreases, on the other hand, the cylinder filling, and thus the engine torque, increase, and in consequence the engine power rises. With this response, the engine thus automatically acts in the same sense for regulation or limiting of the speed of travel in the sense of negative feedback, in that the engine torque setting is reduced when the vehicle goes too fast, while the engine torque is increased when the vehicle goes too slow.

Since the speed of travel can be linked to the engine rotation speed via the circumference of the vehicle wheels and via the axle and transmission step-up ratios, regulation and limiting systems for the vehicle speed are, in the final analysis, rotation speed regulation systems and limiting systems, respectively. In consequence, presetting a desired nominal or limiting speed is equivalent to presetting a corresponding, constant engine rotation speed, which means that in the classical throttle-valve-position-related systems, the throttle valve position, and thus the engine torque as a dependent variable, are set in proportion to the speed control error, with the entire adjustment range being available. The clear association between the control signal emitted from the regulation or limiting system for the desired engine power is thus provided.

Recently, vehicle engine control devices have become of increasing interest which operate at the engine torque level, that is to say with a torque structure. This means that the setting of the engine operation preset control element, for example an accelerator pedal, is assessed as a driver demand for a specific engine torque, and not on for a specific throttle valve position or engine power. In these engine controllers, which have recently become of increasing interest, based on an engine torque preset, an appropriate throttle valve position or an equivalent engine power parameter for the driver's demand, as expressed by him by operation of the engine operation preset control element, is determined only at the end of the engine control action chain, generally on the basis of a suitable engine model. The operation of the engine operation preset control element thus no longer has any direct effect on the throttle valve position, which term, in the following text, also refers to any other, equivalent engine power parameter, particularly in the case of an engine without a throttle valve.

This has exacerbating effects for systems where the speed of travel is regulated and/or limited automatically, because a constant torque preset can be associated with arbitrary engine rotation speeds over wide ranges. If, now, the engine is intended to maintain a specific rotation speed for the present torque preset, for example because the resistance to movement is not forcing any reduction in speed, then this can lead to the vehicle speed being in an unacceptably wide range for precise speed regulation. Furthermore, a constant torque preset means that, in the event of an increase in rotation speed which would result in the torque being reduced, the torque reduction is compensated for by continuous opening of the throttle valve in order to maintain the torque preset. Even though the vehicle speed is increasing, the throttle valve is thus opened further, so that, in the speed regulation system, the control error is first of all increased; that is, there is a positive-feedback effect in the positive direction. Analogously, there is a positive-feedback effect in the negative direction when the rotation speed decreases, in which case the torque would be reduced. But this is compensated for by continuous closure of the throttle valve in order to maintain the torque preset; that is, the throttle valve is closed further even through the vehicle is slowing down, so that the control error of the speed regulation system is once again increased. Thus, without any further actions, the engine in such engine control systems based on torque automatically acts in the opposite sense to conventional regulation and/or limiting of the speed of travel on a throttle valve position or engine power basis, thus not ensuring stable speed regulation or limiting.

In a motor vehicle described in European Patent Document EP 0 299 235 A2 and having a speed regulation device, operation of the accelerator pedal is interpreted as presetting a desired speed of travel.

One object of the invention is to provide a vehicle engine control apparatus of the type mentioned initially which operates at the torque level, and also allows satisfactory regulation and/or limitation of the speed of travel.

This and other objects and advantages are achieved by the control arrangement according to the invention, in which a torque characteristic stage is provided, which emits an engine-torque-related nominal preset signal as a function of the operation of the engine operation preset control element, normally an accelerator pedal. The engine operating state demand expressed by the driver on the control element is in this way interpreted as a torque demand; that is, the engine control system operates on a torque basis, and forms a torque structure. A conventional speed regulation or speed limiting stage operates at the throttle valve position level (that is, the engine power level).

Characteristically, the input side of the speed regulation or speed limiting stage has an associated torque/power characteristic stage, which transforms the engine-torque-related nominal preset signal, produced by the torque characteristic stage from the engine operation preset control element signal, into an appropriate nominal preset signal which is related to the engine power, and is thus related to the throttle valve position. The latter signal can then be processed in a conventional manner by the subsequent speed regulation stage or speed limiting stage, which operates at the throttle valve position level, and thus at the engine power level. In a corresponding way, the output side of the speed regulation or speed limiting stage has an associated power/torque characteristic stage, which corresponds to the inverse of the torque/power characteristic stage on the input side. The power/torque characteristic stage is used to transform the control signal emitted from the speed regulation or speed limiting stage at the throttle valve position level (that is, the engine power level) into a control signal at the engine torque level.

Thus, overall, a speed regulation and/or speed limiting stage which operates in a conventional manner at the engine power level is embedded at a suitable point in the torque structure of an engine control system operating at the engine torque level. Although embedding this behind the torque characteristic stage involves the use of the torque/power characteristic stage and the power/torque characteristic stage, this allows the destabilizing characteristics of the downstream engine control action chain to be taken into account correctively in its characteristics. Furthermore, in consequence, the action chain of the speed regulation or speed limiting stage remains decoupled from the application of an accelerator pedal characteristic which determines the driving characteristics, so that any change in these driving characteristics does not affect any previous application of the speed regulation or speed limiting stage and, in consequence, interactive relationships are avoided.

It is furthermore advantageous that the extremely well-proven, conventional regulator and limiter structures, which operate at the engine power level, can be transferred unchanged to the speed regulation stage and the speed limiting stage, irrespective of the type of air control used by the engine, and irrespective of what variable is used as the regulated variable when the engine torque does not represent the suitable regulated variable. Furthermore, the torque structure of the engine control system can be designed and optimized entirely on the basis of engine factors, without the speed regulation and limiting placing any limitations on this. The path gain of the control path for regulating or limiting the speed is the same as that at the throttle valve position level, which is higher than at the torque level, irrespective of the type of regulator.

One embodiment of the invention includes not only speed regulation but also speed limiting in parallel therewith; and maximum and minimum selection units are provided in a suitable way on the output side of the speed regulation stage and the speed limiting stage, respectively. The maximum selection unit allows the speed regulation to be overwritten by corresponding driver operation of the engine operation preset control element, while the minimum selection unit ensures that a selected limiting speed is not overshot.

Another embodiment of the invention also includes an electrical transmission control which advantageously operates, when the speed regulation or speed limiting is active, on the basis of the engine torque setting produced at the torque level on the output side of the speed regulation or speed limiting stage. For this purpose the engine torque setting is transformed by a characteristic stage which is the inverse of the torque characteristic stage, to a transmission control preset signal at the level of the operating variable of the engine operation preset control element. When speed regulation and speed limiting are inactive, the transmission control preset signal is supplied in a conventional manner directly from the operating signal for this control element (that is, always at the engine power level) in every case.

Other objects, advantages and novel features of the present invention will become apparent from the following detailed description of the invention when considered in conjunction with the accompanying drawings.

BRIEF DESCRIPTION OF THE DRAWINGS

The single FIGURE shows a block diagram of that part of a vehicle engine control apparatus according to the invention, which has speed regulation and speed limiting functionality.

DETAILED DESCRIPTION OF THE DRAWINGS

The vehicle engine control apparatus whose section of interest is shown in the FIGURE is of the type based on a torque preset, from which an engine-power-related control signal, such as a throttle valve nominal position signal, is calculated only at the end of the engine control action chain. The engine operation preset, which can be preset by the driver, is thus an engine torque preset, with an accelerator pedal (which is not shown) being used as normal as the engine operation preset control element.

Such an engine control system at the torque level has certain advantages, for example when used in conjunction with wheel-slit traction control systems and electronic driving stability systems, such as the system with the abbreviation ESP™ introduced by the Applicant. In order to transform the accelerator pedal position to the torque level, it is detected by an accelerator pedal position sensor (not shown) whose output signal is supplied as an accelerator pedal position signal 1 to a first input of a torque characteristic stage 2, whose second input 3 receives an information signal relating to the engine rotation speed N. The torque characteristic stage 2 uses these two input variables and a characteristic stored therein (and having a progressive profile, which is designed for the driving characteristics and good metering capability for the engine torque) to calculate the associated torque preset; (that is, the engine torque currently demanded by the driver via the accelerator pedal), and emits an appropriate engine torque preset signal (nominal preset signal) 4.

The vehicle engine control apparatus includes a conventional speed regulation stage 5 (that is, a Tempomat™, and a conventional speed limiting stage 6, such as a Speedtronic™, in parallel with it). The speed regulation stage 5 comprises the actual regulator unit 7, a progression factor stage 8 following it on the output side, and a degression factor stage 9 connected upstream on the input side. The speed limiting state 6 analogously comprises the actual limiting regulating unit 10, with a progression factor stage 11 connected downstream on the output side, and a degression factor stage 12 connected upstream on the input side. The two progression factor stages 8, 11 of the speed regulation and speed limiting stages 5 and 6 are preferably identical, as the two degression factor stages 9, 12 are also analogous to them. The respective progression factor stage 8, 11 is used to multiply the regulator output signal supplied on the input side by a suitable factor, which is determined from a stored characteristic with a progressive profile as a function of the regulator output signal. This is used for appropriate amplification of the regulator signal. The progressive profile corresponds to the profile of the engine power requirement characteristic. The reason for using the progression factor stage 8, 11 is that this engine power requirement characteristic is typically noticeably non-linear, while the behaviour of the upstream regulator units is essentially linear. The respective degression factor stage 9, 12 is used to invert this process on the input side, that is to say the input signal supplied to the associated regulator unit 7, 10 is multiplied by a degressive factor which corresponds to inversion of the factor of the progression factor stage 8, 11 on the output side, and for which purpose inverse characteristics are stored in a corresponding manner in the degression factor stages 9, 12.

The speed regulation stage 5 and the speed limiting stage 6 operate in a corresponding manner to the conventional system design at the engine power level, that is to say the throttle valve position level, and are thus not suitable for direct connection to the engine torque preset signal 4, which is at the torque level, for the reasons mentioned above. To overcome this, a torque/power characteristic stage 13a, 13b is respectively provided upstream of the speed regulation stage 5 and of the speed limiting stage 6, these torque/power characteristic stages 13a, 13b being identical to one another and being supplied via a first input with the torque preset signal 4, while they receive the engine rotation speed information N via a second input. The respective torque/power characteristic stage 13a, 13b now uses a suitably stored characteristic to determine an engine-power-related output signal (nominal preset signal) 14a, 14b as a function of the instantaneous torque demand 4 and the engine rotation speed N. The torque/power characteristic stage 13a, 13b in consequence ensures that the nominal preset signal 4, which is at the torque level, is converted back to the accelerator pedal position level, or engine power level.

To a first approximation, the engine/power characteristic stored in it for this purpose may be regarded as the inverse of the characteristic which is stored in the torque characteristic stage 2. In an improved system design, the torque/power characteristic stage 13a, 13b also suitably takes account of instabilities in the downstream engine control structure, so that the correspondingly preset characteristic does not in general correspond exactly to the inverse characteristic of the torque characteristic stage 2. Such regulation instabilities are produced in particular by the interaction of the progressively running, rotation-speed-weighted characteristic for conversion from the accelerator pedal position level to the engine torque level using an air-mass nominal value characteristic, on the basis of which the appropriate air mass nominal value is calculated for the determined torque demand. These instabilities can be overcome by suitably modified data assignments for the (stability) characteristic stored in the power/torque characteristic stage 16.

The output signal 14a, 14b from the torque/power characteristic stage 13a, 13b provides a signal at the engine power or throttle valve position level which represents the present engine operation demand by the driver at this level, as is conventionally the case with the accelerator pedal position signal, so that this output signal 14a, 14b forms an input signal which can be used for the speed regulation stage 5 and the speed limiting stage 6. Since the torque/power characteristic stage 13a, 13b and the degression factor stage 9, 12 upstream of the speed regulator unit 7 on the one hand and upstream of the limiting regulator unit 10 on the other hand are respectively identical, it is sufficient, as an alternative to the illustrated double use, to use in each case only one torque/power characteristic stage and/or digression factor stage 9, 12 jointly for the speed regulator unit 7 and the limiting regulator unit 10.

The regulator output signal (speed regulation control signal) 15 emitted by the speed regulation stage 5 can now once again be transformed from the engine power level to the torque level. For this purpose a power/torque characteristic stage 16 receives the regulator output signal 15 as a first input, and the engine rotation speed information as a second input. The power/torque characteristic stage 16 uses the regulator output signal 15 supplied to it to produce the associated torque-speed regulation control signal 17, weighted as a function of the engine rotation speed, on the basis of a suitable, stored stability characteristic; this control signal 17 represents the influence of the speed regulation stage 5 on the engine torque control. The characteristic stored in the power/torque characteristic stage 16 corresponds to the inverse of the characteristic stored in the torque/power characteristic stage 13a, 13b on the input side.

In the same way, a further power/torque characteristic stage 18, which is identical to the already mentioned power/torque characteristic stage 16, is used on the output side of the limiting stage 6 to transform the speed limiting control signal 19 (emitted from the latter) from the engine power level and weighted as a function of the engine rotation speed, to a torque/speed limiting control signal 20 at the torque level.

The torque/speed regulation control signal 17 is supplied to a first input of a maximum selection stage 21, which receives the torque preset signal 4 via a second input and emits the larger of the two signals on the output side. The maximum evaluation stage 21 thus ensures that the driver can use the accelerator pedal to override the influence of the speed regulation, that is to say he can accelerate the vehicle beyond the regulation influence when he operates the accelerator pedal appropriately hard. The output signal 22 emitted from the maximum selection stage 21 is supplied to a first input of a minimum selection stage 23, which receives the torque/speed limiting control signal 20 at a second input and passes on the smaller of the two input signals as the engine torque control signal 24. The minimum selection stage 23 ensures that the engine torque setting cannot be any higher than that allowed by the speed limiting stage 6. The engine torque control signal 24 is then supplied to a downstream engine control apparatus (not shown), which is of no further interest here, but includes, in particular, an engine model to which the engine torque control signal 24 is applied, in order to calculate the air mass nominal value for the filling of the engine cylinders and the various fuel injection parameters and, accordingly, to set the corresponding operating parameters for the engine.

The vehicle engine control device has an associated electronic transmission controller (not shown), to which an associated transmission nominal setting signal (nominal value signal) 25 is supplied from a controllable switch 26, which can be switched between two switch inputs. To one such input the accelerator pedal position signal 1 is applied, and to the other the output signal 27 from a transmission control characteristic stage 28 is applied.

The transmission control characteristic stage 28 is used to transform the engine torque control signal 24, which is at the torque level, into the output signal 27 at the accelerator pedal level, for transmission control. To this end, apart from the engine torque control signal 25, the transmission control characteristic stage 28 receives the engine rotation speed information via a second input and uses the engine torque control signal 24 to determine, weighted by the rotation speed, the transmission control output signal 27 on the basis of a characteristic which is the inverse of that in the torque characteristic stage 2 and is thus used to map a speed regulator signal from the torque level to the accelerator pedal level, for transmission control.

If neither the speed regulation stage 5 nor the speed limiting stage 6 is active, the switch 26 passes on the accelerator pedal position signal 1 as the transmission nominal setting signal 25. If either the speed regulation stage 5 or the speed limiting stage 6 is active, the switch 26 is switched by an OR stage 29 to its other position, so that the transmission nominal setting signal 25 is formed by the output signal 27 from the transmission control characteristic stage 28. In this manner, the transmission control can react properly to the engine control measures from the speed regulation stage 5 and/or from the speed limiting stage 6.

In order to control the switch, the OR stage 29 is supplied via a first input from the maximum selection stage 21 with an information signal 30 defining whether the maximum selection stage 21 is at that time actively passing on the signal 17 produced by the speed regulation. At the same time, via a second input, the OR stage 29 receives an information signal 31 from the minimum selection stage 23 defining whether the latter is at that time actively passing on the signal 20 produced by the speed limiting.

As shown, the speed regulation stage 5 and the speed limiting stage 6 are arranged behind the torque characteristic stage 2 in the control signal direction. Despite the resulting necessity for the torque/power characteristic stage 13a, 13b, this arrangement has major advantages over a feasible, direct link between the speed regulation stage 5 and/or the speed limiting stage 6 and the accelerator pedal position signal 1. This is because, in the latter case, it might not be possible to correct for the destabilizing influences of the subsequent engine control action chain, which has been mentioned above. By virtue of the torque/power and power/torque characteristic stages 13a, 13b, 16, 18, the paths of action of the two regulating units 7, 10 are decoupled from the application of the accelerator pedal characteristic, which is used to determine the driving characteristics. In consequence, any change in the accelerator pedal characteristic or in the driving characteristics has no effect on any previous application of the regulating units 7, 10, and interactive relationships are thus avoided.

On the other hand, the change to the data assignment (which is feasible as an alternative to the described construction of the engine control apparatus) of all the characteristics which are responsible for the positive-feedback response, rather than a negative-feedback response, for torque presetting rather than power presetting, as described above, is not worthwhile. Although this would allow the stability characteristics to be achieved at the throttle valve position level, and would allow the regulator units to operate virtually on the basis of the throttle valve position, it would also make it impossible to exploit the advantages of the torque structure for improving the driving dynamics.

In operating phases without active speed regulation and speed limiting, the engine control effect path acts in such a way that the driver's torque demand 4. is obtained via the torque characteristic stage 2 from the accelerator pedal position set by the driver, and is passed on via the maximum selection stage 21 and the minimum selection stage 23 as the engine torque control signal 24. It is then used to determine, inter alia, the associated throttle valve position for the required air mass flow via the downstream functional blocks and characteristics (not shown), and to set the corresponding engine torque. The air mass nominal value characteristic already mentioned above has significant influence in this downstream engine control structure, and uses the torque demand (as represented by the engine torque control signal 24) to generate an appropriate air mass nominal value.

When at least one of the speed regulation and speed limiting stage is active, the driver's torque demand 4 is transformed back via the torque/power characteristic stage 13a, 13b to the accelerator pedal position level. As mentioned previously, instabilities in the downstream control structure are counteracted, after which the resulting signal is converted via the degression factor stage 9, 12, and is supplied to the associated regulator unit 7, 10 as the initialization value for the accelerator pedal position. The regulator unit 7, 10 produces an output signal as a function of the speed control error or the error between the actual speed and the predetermined, limiting speed; matching to the power characteristic of the vehicle is then carried out in the forward direction, using this output signal and on the basis of the progression factor stage 8, 11. The subsequent power/torque characteristic stage 16, 18 transforms the setting determined by the associated regulator unit 7, 10 to the torque level taking account of the engine rotation speed and, in the process, creates self-stabilizing operating conditions, in the same way as those which occur with the conventional speed regulation and limiting based on a throttle valve position preset.

As is evident from the example explained above, the vehicle engine control apparatus according to the invention has a number of significant advantages. Firstly, the extremely well-proven structure of conventional speed regulation and speed limiting devices which operate at the throttle valve position level (that is, the engine power), and are equally well suited for diesel engines and Otto-cycle engines, can be transferred unchanged. It is in this case irrelevant whether the engine is a naturally aspirated engine with a clear association between the engine power and the throttle valve opening, a supercharged engine, in which the power may increase despite the throttle valve opening being decreased, an Otto-cycle engine with direct injection, in which the throttle valve is fully open over wide operating ranges, or an engine with any other type of air control.

The engine control structure according to the invention can even be used when the engine torque is not a suitable controlled variable, and the latter is thus formed by another variable. The torque structure for engine control may be designed and optimized entirely on the basis of engine aspects, without being impeded by structural requirements for speed regulation or limiting. All the advantages of such a torque structure can be utilized since there is no need to simulate the stability, corresponding to the throttle valve position level, in the main control action chain. The working level of accelerator pedal and regulator presets is distinguished by exact identification of which of the nominal value presets is currently acting. Furthermore, changes from one action path to the other are clear, and precise regulator initialization is possible. The path gain of the control path corresponds to that at the throttle valve position level and is higher than at the torque level, to be precise irrespective of what type of regulator is used, for example a P, PI, PID or PDT1 regulator.

A further advantage of the apparatus according to the invention is that it allows the production of a nominal setting signal for transmission control at the accelerator pedal position level even when the speed regulation or limiting is active (that is, in a virtually identical way to the accelerator pedal position signal). Thus, the gear-selection characteristic of the transmission is unchanged despite torque-based engine control when the speed regulation or limiting is activated. Furthermore, all the engine adaptation processes, such as those relating to air pressure, temperature and friction conditions, are taken into account equally via the accelerator pedal for vehicle management in the activation of the speed regulation and limiting, although this is not possible to this extent by linking the speed regulation stage and/or the speed limiting stage to any point in the engine control/torque structure other than that according to the invention since, then, these adaptations could be entirely or partially ineffective.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Vehicle engine control device for a vehicle having a driver-operated engine operation preset control element, said device comprising:
    a torque characteristic stage which emits an engine-torque-related nominal preset signal as a function of operation of the engine operation preset control element and of engine rotation speed information;
    a torque/power characteristic stage which uses the engine-torque-related nominal preset signal to determine an engine-power-related nominal preset signal as a function of the engine rotation speed;
    a speed control section which includes at least one of
        a speed regulation stage which regulates vehicle traveling speed based on the engine-power-related nominal preset signal, emitting an engine-power-related speed regulation control signal; and
        a speed limiting stage which limits vehicle traveling speed based on the engine-power-related nominal preset signal, emitting an engine-power-related speed limiting control signal; and
    a power/torque characteristic stage at an output side of the speed control section, for transforming an engine-power-related speed regulation or limiting control signal output therefrom, to an engine-torque-related speed regulation or limiting control signal.

2. The vehicle engine control device according to claim 1, wherein said control section comprises both a speed regulation stage and a speed limiting stage, and further comprising:
    a maximum selection stage which is supplied with the engine-torque-related nominal preset signal emitted by the torque characteristic stage and with the engine-torque-related speed regulation control signal, and which passes on the greater of the two signals as the output signal; and
    a minimum selection stage, which is supplied with the output signal from the maximum selection stage and with the engine-torque-related speed limiting control signal, and which emits the greater of the two signals as the engine torque control signal.

3. The vehicle engine control apparatus according to claim 2, further comprising:
    a switch which, when speed regulation and speed limiting are inactive, emits a signal that is representative of the operation of the engine operation preset control element and, when one of speed regulation and speed limiting is active, emits a signal, that represents the effect of the speed regulation or the speed limiting, as a nominal value signal for electrical transmission control; and
    a transmission control characteristic stage, which uses an engine torque control signal to determine, as a function of the engine rotation speed, a signal for a transmission controller, which signal represents the effect the active speed regulation and the speed limiting.

4. The vehicle engine control apparatus according to claim 1, wherein both the engine-power-related nominal preset signal and the engine-power-related speed regulation control signal or the speed limiting control signal represent signals related to the accelerator pedal position level.

5. The vehicle engine control apparatus according to claim 1, wherein both the engine-power-related nominal preset signal and the engine-power-related speed regulation control signal or the speed limiting control signal represent signals related to the throttle valve position level.

6. A method for controlling engine operation in a vehicle having a driver operated engine control element and a speed control section which generates an engine power-related vehicle speed control signal as a function of operation of said engine control element and of a preset desired speed related value, said method comprising:
    generating an engine torque related nominal signal value as a function of operation of said engine control element;
    determining an engine power related nominal signal value as a function of said engine torque related nominal signal value;
    inputting said engine power related nominal signal value to said speed control section, said speed control section generating said engine power related vehicle speed control signal as a function of said engine power related nominal signal value and of a preset desired speed related value;
    determining an engine torque related speed control signal value as a function of said engine power related vehicle speed control signal; and
    controlling operation of said engine based on said engine torque related speed control signal value.

7. The method according to claim 6, wherein said engine power related vehicle speed control signal comprises at least one of a speed limiting signal and a speed regulating signal.

8. The method according to claim 6, wherein said first and second determining steps are performed by means of stored characteristic data.

* * * * *